United States Patent [19]
Block

[11] 3,768,660
[45] Oct. 30, 1973

[54] REVERSE OSMOSIS CELL WITH TURBULATOR MEANS

[75] Inventor: Leo Block, Woodland Hills, Calif.

[73] Assignee: Raypak, Inc., Westlake Village, Calif.

[22] Filed: Feb. 14, 1972

[21] Appl. No.: 225,988

[52] U.S. Cl.................. 210/321, 210/355, 210/433
[51] Int. Cl............................................ B01d 31/00
[58] Field of Search...................... 210/23, 321, 323, 210/414, 332, 355, 433

[56] References Cited
UNITED STATES PATENTS

| | | | |
|---|---|---|---|
| 3,608,730 | 9/1971 | Blaha............................. | 210/323 X |
| 3,310,175 | 3/1967 | McLagan....................... | 210/332 X |
| 3,648,754 | 3/1972 | Sephton......................... | 210/321 X |

FOREIGN PATENTS OR APPLICATIONS

| | | | |
|---|---|---|---|
| 1,068,252 | 2/1954 | France.............................. | 210/414 |

Primary Examiner—Frank A. Spear, Jr.
Attorney—Albert M. Herzig et al.

[57] ABSTRACT

A reverse osmosis cell of the type embodying an elongated, hollow, porous core having an osmotic membrane on the exterior thereof. The core with membrane is within a tubular shell, or tube section. The feed fluid is in the annulus between the core and tubular shell. The flow of feed fluid is a continuous series flow in a serpentine channel at pressure and velocity. A flexible helical member encircles the core to provide turbulence and velocity flow adjacent the membrane. The velocity acting against the convolutions displaces them axially allowing them to return when the pressure is released to cause flushing out of any solid particulate matter adjacent the membrane.

7 Claims, 8 Drawing Figures

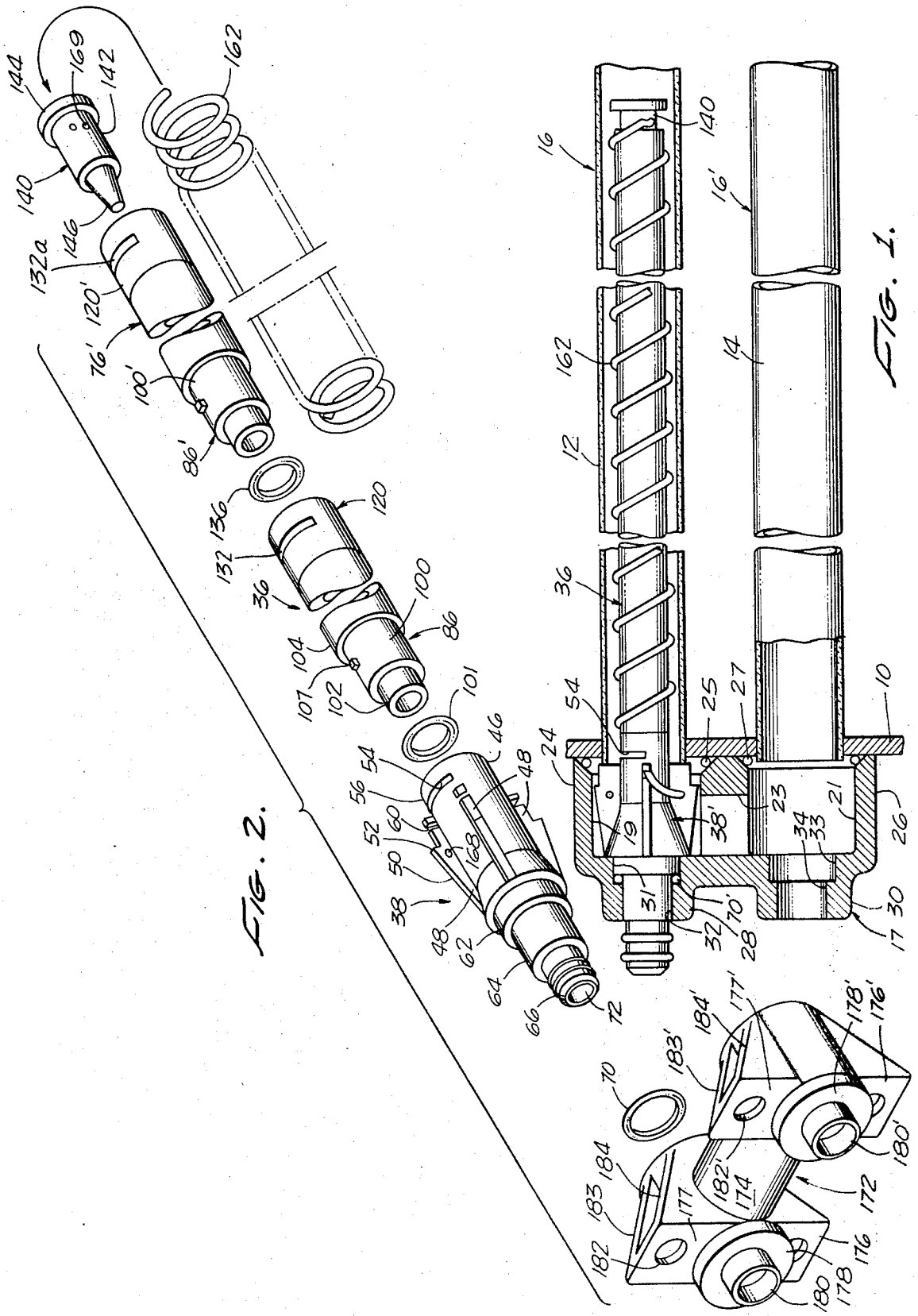

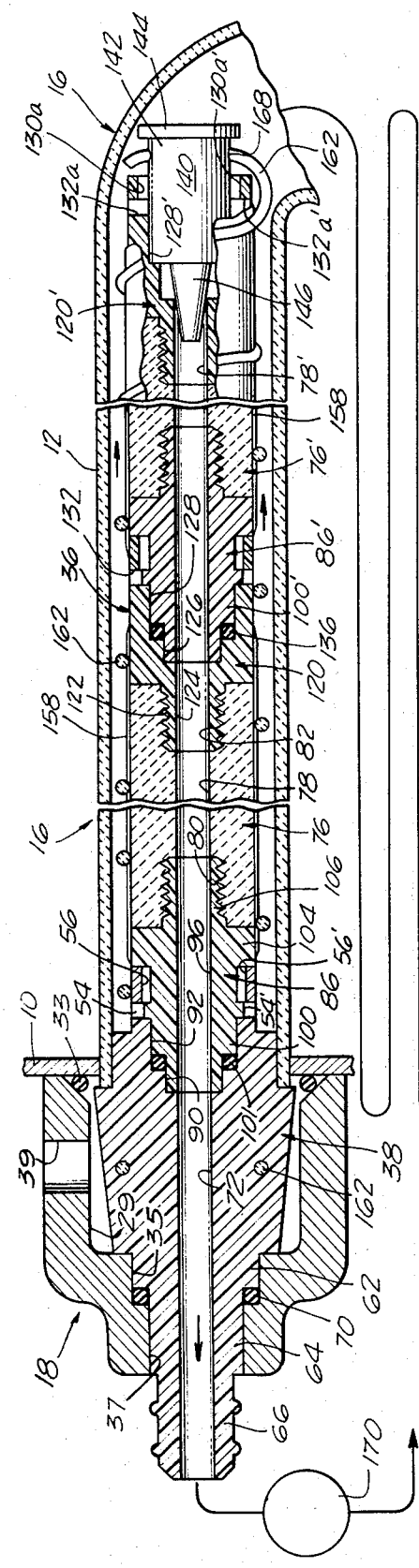
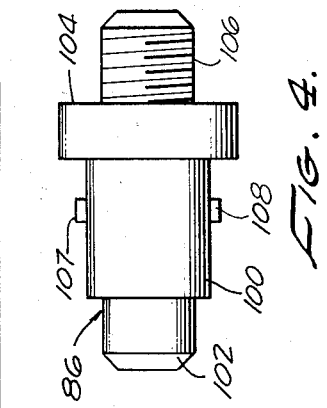
FIG. 4.
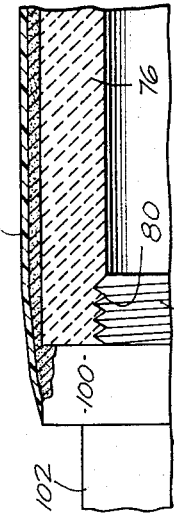
FIG. 7.
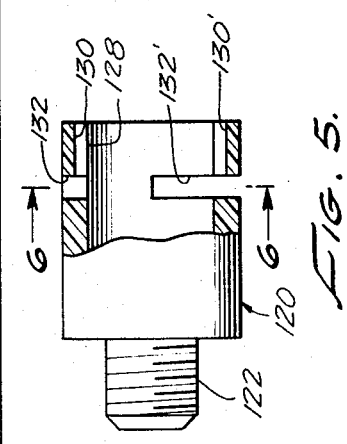
FIG. 5.
FIG. 6.
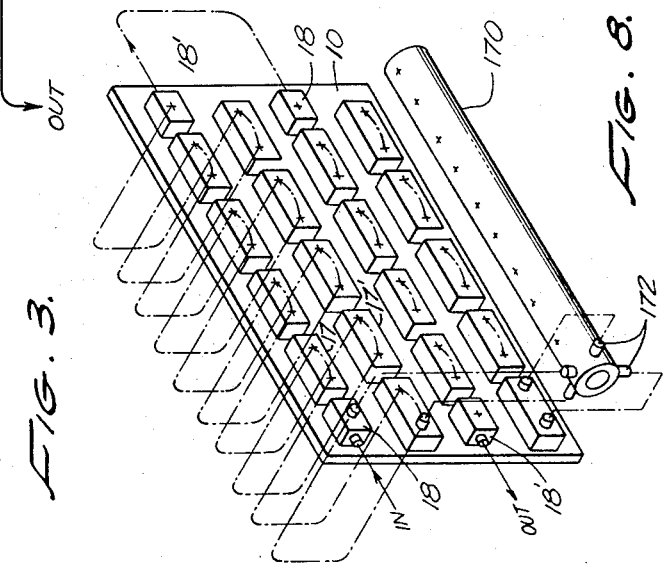
FIG. 3.
FIG. 8.

REVERSE OSMOSIS CELL WITH TURBULATOR MEANS

SUMMARY OF THE INVENTION

The invention relates primarily to reverse osmosis cells adapted for use in various processes involving reverse osmosis. In the exemplary form of the invention described in detail herein, the cell is for the desalination or purification of water by means of an osmotic membrane element. The cell embodies an elongated cylindrical core made of porous material which is positioned within a cylindrical housing providing an annular space between the core and the housing. The osmotic membrane is on the outside of the core member. The permeate finds its way through the membrane and the core to the bore within the core member, the feed fluid being in the annular space between the core and the housing. This is a very advantageous type of construction of a reverse osmosis cell; but in the industrial adaptation, fabrication, and utilization of such cell, difficult problems have been encountered, solutions of which constitute objects of the herein invention.

As stated, the invention is adaptable in various types of reverse osmosis cells and machines and wherever a membrane is on a cylindrical surface exposed to a fluid.

In commercial reverse osmosis machines, it is desirable to utilize a large number of cells in a compact assembly. In a preferred configuration, individual cells are positioned in straight lengths of tubing or in tube sections which form part of a continuous, serpentine channel, there being a continuous flow of feed fluid while the permeate is taken off from the cells by way of a manifold. Preferably, the cells are of modular construction comprising modules of predetermined lengths with male and female end core fittings threaded to the core material. The modules are joined by way of bayonet joints between the male and female core fittings. The core fitting at the end of a cell is closed by way of a sealing plug. The membrane at the ends of the cell seals as described in the foregoing. This construction provides an axially strong and rigid cell. The pressure of the water (or other fluid) to be purified in the annular space may run as high as 1,500 p.s.i. The pressure of the permeate within the cores may run as high as 40 to 50 p.s.i., depending on the head to which the interiors may be connected.

The flow of feed fluid in the annulus between the core and tube or shell is at velocity, and it is desired that the flow be turbulated. The herein invention provides a flexible helical spring wire member in the annulus around the core to turbulate the flow adjacent the membrane. An object of the invention is to turbulate the flow in this manner. Velocity flow acts on the convolutions of the helical member to displace it axially when the feed fluid is flowing. When the flow is stopped, the helical spring member returns to its original position, the convolutions moving axially in the opposite direction, effectively causing any particulate matter adjacent the membrane to be flushed out.

An object of the invention is to realize this purpose in the manner described, that is, simply by axial displacement of the spring convolutions resulting from the change in velocity flow.

A further object is to realize the effect and result that a circular flow is induced producing centrifugal force causing any larger particles to be thrown away from the membrane.

Another object is to provide a spring wire of optimum size in the annulus of less than the radial dimension to avoid excessive pressure drop and to produce maximum velocity flow adjacent the membrane.

BRIEF DESCRIPTION OF THE DRAWINGS

Further objects and additional advantages of the invention will be come apparent from the following description and annexed drawings wherein:

FIG. 1 is a cross sectional view of tube sections of U-tubes connected by a header in a reverse osmosis machine embodying the invention.

FIG. 2 is an exploded perspective view of one of the desalination cells of the invention;

FIG. 3 is a cross sectional view of a single cell of the invention with the membrane in place within a feed tube section;

FIG. 4 is a detail view of a male end core fitting;

FIG. 5 is a detail view, partly in section, of a female end core fitting;

FIG. 6 is a cross sectional view taken along the line 6—6 of FIG. 5;

FIG. 7 is a detail sectional view of an end part of a core showing the seal provided by the membrane; and FIG. 8 is a partial perspective view of the tube assembly of a reverse osmosis machine embodying the invention.

DESCRIPTION OF THE PREFERRED EMBODIMENT

FIG. 1 of the drawings is a sectional view of a part of the reverse osmosis machine as shown in FIG. 8 showing a part of the tube sheet and one header. The tube sheet is designated at 10 having secured in it the ends of the tubes 12 and 14 which are sections of similar U-tubes 16 and 16'. Numeral 17 designates a metal header casting which connects tube sections 12 and 14. Header 17 has mounting lugs which can be attached to the tube sheet 10 by suitable means. It has two integral, cylindrical parts as indicated at 24 and 26 which have extending bosses or nipples 28 and 30 having bores 32 and 34 and counterbores 31 and 33 as may be seen in FIG. 1. These bores receive cylindrical parts of plastic fittings forming part of the desalination cells as will be described more particularly presently. Within parts 24 and 26 are bores 19 and 21 connected by passageway or port 23. Bores 19 and 21 are beveled at their ends as shown and sealed to tube sheet 10 by O-rings 25 and 27.

The headers like 17 connect U-tubes like 16 in successive tiers at different levels as may be seen in FIG. 8 which will be described more in detail presently.

Numeral 18 designates an inlet header casting and 18' designates a similar casting which is an outlet header. Inlet header 18 is shown in detail in FIG. 3. It has a bore 29, counterbore 35, counterbore 37, and inlet port 39. Bore 29 is bevelled at its end and sealed to tube sheet 10 by O-ring 33. Header 18 has mounting lugs for attaching like casting 17.

Within tube 11 of U section 16 is shown a cylindrical desalination cell 36 having plastic end fitting 38 which will be described more in detail presently.

The reverse osmosis cell is shown in perspective in FIG. 2 and in cross section to FIG. 3. The fitting 38 has a configuration as shown in FIGS. 2 and 3. As may be observed, it has a cylindrical part 46 which has equally angularly spaced ribs 48, the outside surfaces of which have a taper as shown at 50. The end part of each rib is cut away forming a square shoulder as shown at 52. Numeral 54 designates one of a pair of circumferential bayonet slots near the end of fitting 38. Axial slot 56 is one of a pair communicating with the circumferential slots. The end part of the rib 48 has a radial slot as shown at 60.

At the left end of fitting 38, there are portions of progressively smaller diameter as designated at 62, 64, and 66. FIGS. 1 and 3 illustrate the manner in which the fitting 38 fits into castings 17 and 18. The end part 62 of fitting 38 is in counterbore 35 and abuts against an O-ring 70. Part 64 fits into bore 37. Part 66 extends exteriorly of casting 18. Fitting 38 has a cylindrical bore 72. Its right end extends through tube sheet 10.

FIG. 1 shows core fitting 38' similarly assembled in header casting 17 against O-ring 70'.

Reverse osmosis cell 36 is formed in modular sections as may be seen in FIGS. 2 and 3. One of the sections comprises a cylindrical porous core member 76 which may be made of ceramic as designated at 76. The porous member has a bore 78. Numeral 76' designates another similar module section. Section 76 has threaded end counterbores as designated at 80 and 82. Numeral 86 designates a male plastic core fitting which is shown in detail in FIG. 4.

Fitting 38 in addition to the bore 72 has a first counterbore 90 and a second counterbore 92. The male core fitting couples the porous section 76 to end fitting 38.

Male core fitting 86 has a bore 96 of the same size as bores 72 and 78. It has an intermediate cylindrical part 100 having a diameter to fit into the counterbore 92. It has an extending end part 102 of a diameter to fit into counterbore 90. It has an intermediate part 104 of a larger diameter, this diameter being the same as the outside of core member 76. Core fitting 86 has extending threaded end part 106 which is of a size to thread into threaded bore 80 in the end of core member 76. The male core fitting 86 has extending projections or knobs 107 and 108.

FIG. 3 shows the assembly between the core member 76 and male core fitting 76 and end fitting 38. Threaded end 106 of core fitting 86 is threaded into threaded counterbore 80 in the end of core member 76 with part 104 abutting against the end of the core member. The male core member 86 is joined to the end fitting 38, the extending projections 107 and 108 having been received into the axial slots 56 and 56' in the end of fitting 38 after which these projections are rotated into the circumferential slots 54 and 54' in fitting 38, thus, forming a bayonet joint or lock between these parts. Part 100 fits against O-ring 101 in bore 92.

Numeral 120 designates a female core fitting at the other end of core member 76. It is shown in detail in FIG. 5. It is cylindrical, having an outside diameter the same as the outside diameter of the core member 76. It has an extended threaded part 122 of a size to thread into the threaded counterbore 82 in the end of core member 76. It has a bore 124 of the same size as bores 72, 78, and 96. It has a first counterbore 126 and a second counterbore 128. It has axial slots 130 and 130' and circumferential slots 132 and 132' adapted to form part of a bayonet joint or coupling. Numeral 86' designates a second male core fitting which in FIG. 3 is assembled to the female core fitting 120 in the manner already described in connection with fitting 38. Between part 100' of core fitting 86' and the bottom of the counterbore 128 is provided a sealing O-ring 136.

Numeral 76' designates another modular core section to the right end of which is joined another female core fitting 120' which is like the core fitting 120. Numeral 140 designates an end plug which may be made of plastic and which serves to close the end of the reverse osmosis cell. It has a cylindrical body 142 of a diameter to fit into the counterbore 128' in core fitting 120'. The body has an end flange 144 as shown. At the other end is a tapered extension or plug 146 adapted to extend into bore 78' in core member 120' to close it. End member 140 does not have extending projections adapted to be received in axial slots 130a and 130a' in core fitting 120' and to be turned into the circumferential slots 132a and 132a', although it could have. Pressure in the U-tube holds end plug 140 in position.

Numeral 158 designates the membrane which is on the exterior of the core of the reverse osmosis cell. Typically, the membrane consists of an outer skin and a jelly-like substructure which is between the skin and the outer surface of the core, as illustrated in FIG. 7. The membrane may be of various types, for example, it may be of a type referred to in U.S. Pat. No. 3,400,825 or of other types known in the art. The problem which has been encountered in this type of construction in the past has been of sealing the membrane to the pressure vessel which surrounds or encloses the reverse osmosis cell. In the construction shown and as illustrated in FIG. 7, porous core member 76 is closed by male core fitting 86 which has the threaded part 106 threaded into threaded bore 80. This seals the end of the bore and also provides axial strength and rigidity. It is possible to adhesively attach the core fitting, but the structure shown is preferred. As may be seen in FIG. 7, membrane 158, which is applied to and on the reverse osmosis cell, bridges the joint between core fitting 86 and the end of core member 76. Membrane 158 is terminated at part 100 of core fitting 86 as shown in FIG. 7. Also preferably, the material of core fitting 86 is selected so that it unites chemically with membrane material 158 to form an alloy of the two materials so as to positively insure a perfect seal. The membrane material may be cellulose acetate composition as known in the art, and the core fitting material may be a polycarbonate plastic, by way of example.

The direction of flow, that is, the feed fluid and permeate in FIG. 3, as indicated by the arrows.

As explained, there are a plurality of U-tubes like the tubes 16 connected to headers 17 mounted from tube sheet 10 with a reverse osmosis cell in each tube section with a continuous series flow of feed fluid through the tubes as illustrated in FIGS. 3 and 8.

The end parts 66 of fittings 38 which extend from the headers connect to a permeate manifold 170 as may be seen in FIG. 8. Manifold 170 has four series of equally angularly spaced nipples as indicated at 172, these series of nipples being connected to the end parts or nipples 66 of the reverse osmosis cells. The purified fluid is drawn off through this manifold. The feed of fluid to be purified or desalinized, in the case of desalination cells, connects to the inlet header 18 as designated by the arrow. The concentrate is taken off at the outlet header 18' as indicated.

In FIG. 2, there is shown a slightly modified form of header as designated at 172. This header corresponds to header 17. This header has an intermediate tubular part 174 and end sections 176 and 176' having faces 177 and 177' which attach against tube sheet 10. These faces have cylindrical bosses 178 and 178' with extending tubular nipples 180 and 180' through which the end parts 66 and 66' of end fittings 38 extend. Numerals 182 and 182' designates holes for securing bolts insertable between webs 183, 184, 183', and 184'.

If desired, headers like 17 and 18 can be fabricated as an integral header unit rather than being two separate units.

Means are provided to produce turbulent flow in the annular space between cell 36 and tube 11 and for other purposes as will be described. This means takes the form of a helical wire as designated at 162 around cell 36. It may be a plastic wire of the same type as used in notebook binders. This plastic wire occupies about one-half of the radial dimension of the annular space and forces turbulent flow at velocity in the annular space adjacent to the core. There is no need to have high velocity turbulent flow away from the membrane so that the helical wire need not occupy the entire annular space. As a result, less power is required for the flow than would otherwise be necessary. Turbulent flow improves the Reynolds number which is characteristic of the degree of turbulence of the flow as distinguished from laminar flow. There is a slight clearance between the surface of the core of cell 36 and wire 162. Water pressure acts equally on the entire surface of the wire. Flow of water in the direction of the arrows is such that it impinges against the convolutions of the spring and tends to create a partial vacuum or reduce the pressure area on the downstream side of the convolutions. This results in a force tending to move the helical wire axially along the surface of the core. The velocity tends to cause this movement.

When the unit is not operating and there is no flow of water, the wire spring is in a given position. When the unit is in operation and the water is flowing and impinging against the upstream side of the convolutions of the wire, they are caused to move slightly in the direction of flow. When the unit is stopped and flow is terminated, the spring returns to its original position. Thus, there is axial movement of the spring wire convolutions along the surface of the core which serves to remove any build up of particulate matter on the surface of the membrane. The clearance between the spring and the surface of the membrane is extremely small. The helical flow produced by the spring imparts a centrifugal motion to the water flowing through the annular space. This centrifugal force tends to throw any entrained solid particles radially outward against the wall of the tube, that is, away from the surface of the membrane. In this way, the spring acts to reduce the probability of entrained solid particles from damaging the surface of the membrane.

One end of the spring can be secured to fitting 38 by being extended through a transverse bore or hole 168 in web 48. The wire can also be fitted into slots such as slot 60. The other end is passed through a transverse hole or bore 169 in plug 140.

From the foregoing, those skilled in the art will fully understand the nature and construction of the invention, its operation, and the manner in which it achieves and realizes the objects and advantages set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. In a system embodying an elongated porous core member having an exterior cylindrical surface and having an axial bore presenting a cylindrical surface, a tubular member having the core member within it, a semipermeable membrane covering one of said surfaces, one of said surfaces being exposed to a liquid adapted to permeate through the membrane and through the porous core member; means comprising a flexible, helical member positioned to have convolutions adjacent said one of said surfaces; and means whereby said one surface is exposed to flowing liquid whereby to produce a turbulent velocity flow along said surface, the convolutions of said flexible member being sufficiently flexible that axial flow displaces them axially along said surface, said convolutions returning to initial position when flow is stopped, whereby the axial displacement movement of said convolutions allows any particulate matter adjacent said surfaces to be flushed away.

2. A system as in claim 1, wherein said flexible helical member is within the annulus between the core member and tubular member.

3. A system as in claim 2, wherein said helical member occupies less than the radial distance between the core member and the tube.

4. A system as in claim 1, wherein said elongated core member is closed at one end, said flexible helical member having one end attached to the closed end of said core member and having its other end attached to the other end of said core member.

5. A system as in claim 4, wherein said core member is formed in sections, and said helical member extending the full length of the core member.

6. A system as in claim 4, comprising a plurality of cells arranged for flow of feed liquid through them, each cell comprising one of said elongated porous core members within an elongated tube, each cell being mounted at one end, said mounting means constructed to provide a sealed joint and having sufficient strength to prevent the cell from pulling apart as a result of a higher pressure within the cell and exterior to it.

7. A system as in claim 6, wherein each cell comprises a plurality of sections which are detachable from each other, said semipermeable membrane being discontinuous at the position of the joints between cells.

* * * * *